(12) United States Patent
Ziada et al.

(10) Patent No.: US 10,753,823 B2
(45) Date of Patent: Aug. 25, 2020

(54) DYNAMIC CHARACTERIZATION SYSTEM FOR MEASURING A DYNAMIC RESPONSE

(71) Applicant: Ford Motor Company, Dearborn, MI (US)

(72) Inventors: Youssef Ziada, Milford, MI (US); David Stephenson, Detroit, MI (US)

(73) Assignee: Ford Motor Company, Dearborn, MI (US)

( * ) Notice: Subject to any disclaimer, the term of this patent is extended or adjusted under 35 U.S.C. 154(b) by 126 days.

(21) Appl. No.: 15/729,579

(22) Filed: Oct. 10, 2017

(65) Prior Publication Data

US 2019/0107461 A1 Apr. 11, 2019

(51) Int. Cl.
  *G01M 7/02* (2006.01)
  *G01H 1/00* (2006.01)
  *B23Q 17/12* (2006.01)
  *B23Q 15/007* (2006.01)

(52) U.S. Cl.
  CPC ............ *G01M 7/022* (2013.01); *G01H 1/003* (2013.01); *G01M 7/025* (2013.01); *B23Q 15/007* (2013.01); *B23Q 17/12* (2013.01); *B23Q 2717/00* (2013.01)

(58) Field of Classification Search
  CPC .. G01M 7/022; G01M 13/028; G01M 13/048; G01F 23/2966; G01N 29/14; G01N 29/42; B23Q 15/007; B23Q 17/12; B23Q 17/0961; B23Q 17/0976; B23Q 17/0971; B23Q 17/0957; G01H 1/003
  See application file for complete search history.

(56) References Cited

U.S. PATENT DOCUMENTS

| | | | | |
|---|---|---|---|---|
| 4,061,017 A * | 12/1977 | Sloane | ................... | G01M 7/022 73/579 |
| 4,471,444 A * | 9/1984 | Yee | ..................... | B23Q 17/0947 700/175 |
| 4,514,797 A * | 4/1985 | Begin | ................. | G05B 19/4065 340/680 |
| 4,559,600 A * | 12/1985 | Rao | ..................... | G05B 19/4163 340/680 |
| 4,562,392 A * | 12/1985 | Davis | ..................... | G01B 21/10 318/39 |
| 4,716,657 A | 1/1988 | Collingwood | | |
| 4,723,219 A * | 2/1988 | Beyer | ................. | G05B 19/4067 318/572 |
| 4,918,988 A * | 4/1990 | Ebihara | ................... | G01M 7/08 73/12.09 |
| 4,985,857 A * | 1/1991 | Bajpai | ................ | G05B 19/4065 702/184 |

(Continued)

*Primary Examiner* — Helen C Kwok
(74) *Attorney, Agent, or Firm* — Burris Law, PLLC

(57) ABSTRACT

The present disclosure relates to a system for measuring a dynamic response of a machine. The system includes a vibration mechanism, an accelerometer, a controller and a casing. The vibration mechanism is operable to generate an excitation signal, and the accelerometer is operable to measure dynamic energy in response to the excitation signal and output a dynamic response signal indicative of the dynamic energy. The controller includes a communication interface and operates the vibration mechanism to output the excitation signal and transmit a vibration input signal based on the excitation signal by way of the communication interface. The casing houses the vibration mechanism and the controller.

20 Claims, 4 Drawing Sheets

(56) References Cited

U.S. PATENT DOCUMENTS

| | | | | |
|---|---|---|---|---|
| 5,058,433 A * | 10/1991 | Wilson | G01B 7/002 | 318/572 |
| 5,214,960 A * | 6/1993 | Tsuboi | G01H 1/14 | 702/39 |
| 5,407,265 A * | 4/1995 | Hamidieh | B23Q 17/0947 | 340/680 |
| 5,518,347 A * | 5/1996 | Cobb, Jr. | B23B 29/022 | 188/379 |
| 5,663,894 A * | 9/1997 | Seth | G05B 19/4063 | 702/56 |
| 6,289,735 B1 * | 9/2001 | Dister | G01H 1/003 | 73/579 |
| 6,382,027 B1 * | 5/2002 | Uhlig | G01N 29/14 | 73/579 |
| 6,484,109 B1 * | 11/2002 | Lofall | G01H 1/003 | 702/56 |
| 6,598,480 B2 * | 7/2003 | Horiuchi | G01M 7/00 | 702/33 |
| 6,604,013 B1 * | 8/2003 | Hamidieh | G05B 19/4065 | 700/174 |
| 6,718,270 B2 * | 4/2004 | Horiuchi | G01M 7/00 | 310/51 |
| 6,799,126 B1 * | 9/2004 | Ratcliffe | G01N 29/14 | 702/35 |
| 6,845,340 B2 * | 1/2005 | Edie | B23Q 17/0971 | 324/522 |
| 6,859,674 B1 * | 2/2005 | Seth | B23Q 17/00 | 700/97 |
| 7,140,252 B2 | 11/2006 | Hamidieh et al. | | |
| 7,216,536 B2 * | 5/2007 | Young | G01F 17/00 | 73/290 V |
| 7,383,097 B2 | 6/2008 | Jalluri et al. | | |
| 7,409,261 B2 | 8/2008 | Jalluri et al. | | |
| 7,571,022 B2 | 8/2009 | Jalluri et al. | | |
| 7,578,192 B2 | 8/2009 | Liasi et al. | | |
| 7,900,498 B1 * | 3/2011 | Ratcliffe | G01L 5/0052 | 73/12.01 |
| 8,224,492 B2 * | 7/2012 | Lakomiak | G01H 1/003 | 340/683 |
| 8,380,462 B2 | 2/2013 | Jalluri et al. | | |
| 8,408,066 B1 * | 4/2013 | Romero | G01M 7/022 | 310/328 |
| 8,473,252 B2 * | 6/2013 | Kar | G05B 23/0221 | 340/679 |
| 8,579,563 B2 * | 11/2013 | Kimura | B23B 29/125 | 409/289 |
| 8,610,393 B2 * | 12/2013 | Barkman | G05B 19/401 | 318/561 |
| 8,700,201 B2 * | 4/2014 | Yoshino | B23Q 17/0976 | 700/174 |
| 8,786,455 B2 | 7/2014 | Perry et al. | | |
| 8,803,698 B1 * | 8/2014 | Heydron | G01H 1/003 | 340/683 |
| 9,618,037 B2 * | 4/2017 | Kar | F16C 19/52 | |
| 2002/0169569 A1 * | 11/2002 | Miller | G01H 1/003 | 702/56 |
| 2003/0060920 A1 * | 3/2003 | Kishlyansky | G01H 1/003 | 700/175 |
| 2003/0065481 A1 * | 4/2003 | Fujishima | G05B 19/404 | 702/182 |
| 2004/0176926 A1 * | 9/2004 | Edie | B23Q 17/0971 | 702/179 |
| 2005/0049801 A1 * | 3/2005 | Lindberg | G01D 18/008 | 702/34 |
| 2006/0089742 A1 * | 4/2006 | Jalluri | G05B 19/4065 | 700/159 |
| 2007/0016325 A1 * | 1/2007 | Esterling | B23Q 17/0961 | 700/175 |
| 2007/0088454 A1 * | 4/2007 | Jalluri | G05B 19/4065 | 700/159 |
| 2007/0272023 A1 * | 11/2007 | Dwyer | G01H 1/003 | 73/649 |
| 2009/0038450 A1 * | 2/2009 | Campbell | B23B 29/125 | 82/1.11 |
| 2009/0306802 A1 * | 12/2009 | Cone | G06F 17/5004 | 700/98 |
| 2011/0040504 A1 * | 2/2011 | Liu | G01N 33/025 | 702/56 |
| 2011/0222980 A1 * | 9/2011 | Kuo | B23Q 11/0039 | 409/80 |
| 2011/0303012 A1 * | 12/2011 | Amundsen | G01B 7/066 | 73/579 |
| 2013/0192356 A1 * | 8/2013 | De Graff | F41H 1/04 | 73/152.01 |
| 2014/0249772 A1 * | 9/2014 | Sprenger | G01B 5/008 | 702/152 |
| 2014/0262392 A1 * | 9/2014 | Petrossians | G01M 1/22 | 173/20 |
| 2015/0007634 A1 * | 1/2015 | Wallace | G01N 3/30 | 73/12.09 |
| 2015/0032389 A1 * | 1/2015 | Hedin | G01H 1/003 | 702/34 |
| 2016/0054722 A1 | 2/2016 | Jalluri et al. | | |
| 2016/0202036 A1 | 7/2016 | Jalluri et al. | | |
| 2016/0371957 A1 * | 12/2016 | Ghaffari | G01M 5/00 | |
| 2018/0149473 A1 * | 5/2018 | Sprenger | G01B 21/045 | |
| 2019/0027812 A1 * | 1/2019 | Kim | H01Q 1/48 | |
| 2019/0061085 A1 * | 2/2019 | Jung | B23Q 3/12 | |

* cited by examiner

DYNAMIC CHARACTERIZATION SYSTEM FOR MEASURING A DYNAMIC RESPONSE

FIELD

The present disclosure relates to a system for measuring a dynamic response of a machine.

BACKGROUND

The statements in this section merely provide background information related to the present disclosure and may not constitute prior art.

Computer numeric control (CNC) machines are operable to perform high speed machining of workpieces, such as aluminum blocks, to form a part. When machining at high cutting speeds, especially with thin walled workpieces, structural dynamics of the machine can become a concern for preventing excessive or unstable vibration. An existing condition indicator analysis box (CIAB) system measures vibrations during cutting, but cannot be used to determine the machine structural dynamics (i.e., natural frequencies and vibration modes).

Currently manual offline testing is used to calibrate and troubleshoot unstable vibrations. For example, with the CNC machine being offline, an operator strikes the CNC machine with an instrumented hammer at one or more points along the machine and vibrations measurements are taken using accelerometers. This operation is subject to operator error and can result in inaccuracies due to an unknown and varying force applied to the machine.

Furthermore, the wear and tear of a tool used by the CNC machine is largely unknown, and periodic preventative maintenance is required. This incurs expensive costs as components with significant remaining life are replaced, machine tools are taken out of service and operators are tied up in unnecessary maintenance. These and other issues are addressed by the teachings of the present disclosure.

SUMMARY

This section provides a general summary of the disclosure, and is not a comprehensive disclosure of its full scope or all of its features.

In one form, the present disclosure is directed to a dynamic characterization system that includes a vibration mechanism operable to generate an excitation signal, an accelerometer, a controller including a communication interface, and a casing. The accelerometer is operable to measure dynamic energy in response to the excitation signal and output a dynamic response signal indicative of the dynamic energy. The controller is configured to operate the vibration mechanism to output the excitation signal and transmit a vibration input signal based on the excitation signal by way of the communication interface. The casing houses the vibration mechanism and the controller.

In another form, the casing houses the accelerometer.

In yet another form, the controller transmits a vibration signal based on the dynamic response signal from the accelerometer by way of the communication interface.

In one form, the accelerometer is located separately from the casing.

In another form, the dynamic characterization system further comprises a power source supplying power to at least one of the vibration mechanism or the controller, and the casing houses the power source.

In yet another form, the power source is a turbine generator.

In another form, the vibration mechanism is piezoelectric actuator.

In one form, the communication interface includes a wireless transceiver.

In another form, the vibration mechanism is operable to output different excitation signals.

In one form, the present disclosure is directed toward a dynamic characterization system for measuring dynamic response of an object. The system includes a piezoelectric actuator operable to generate an excitation signal, an accelerometer, a controller including a wireless transceiver, and a casing. The accelerometer is operable to measure dynamic energy in response to the excitation signal and generate a dynamic response signal indicative of the dynamic energy. The casing is configured to attach and detach from the object. The casing further houses the vibration mechanism and the controller. The controller is configured to operate the piezoelectric actuator to output the excitation signal and output data based on the excitation signal by way of the wireless transceiver.

In another form, the system further comprises a power source supplying power to the vibration mechanism and the controller.

In one form, the casing houses the accelerometer and the accelerometer outputs the dynamic response signal to the controller.

In another form, the controller is configured to filter the dynamic response signal from the accelerometer and output data indicative of the filtered dynamic response signal using the wireless transceiver.

In yet another form, the controller transposes the dynamic response signal from a measured location to a desired location.

In one form, the accelerometer is positioned on the object at a location separate from the casing.

In one form, the present disclosure is directed toward a system for measuring dynamic response of a machine. The system comprises a piezoelectric actuator operable to generate an excitation signal, an accelerometer, a controller, and a casing. The accelerometer is operable to output a dynamic response signal indicative of dynamic energy of the machine. The controller is configured to operate the piezoelectric actuator to output the excitation signal and output data indicative of the excitation signal. The casing houses the piezoelectric actuator and the controller and configured to attach to the machine.

In one form, the casing houses the accelerometer.

In another form, the accelerometer is positioned on the machine separate from the casing.

In yet another form, the system further comprises a turbine generator for supplying power to at least one of the controller or the piezoelectric actuator.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
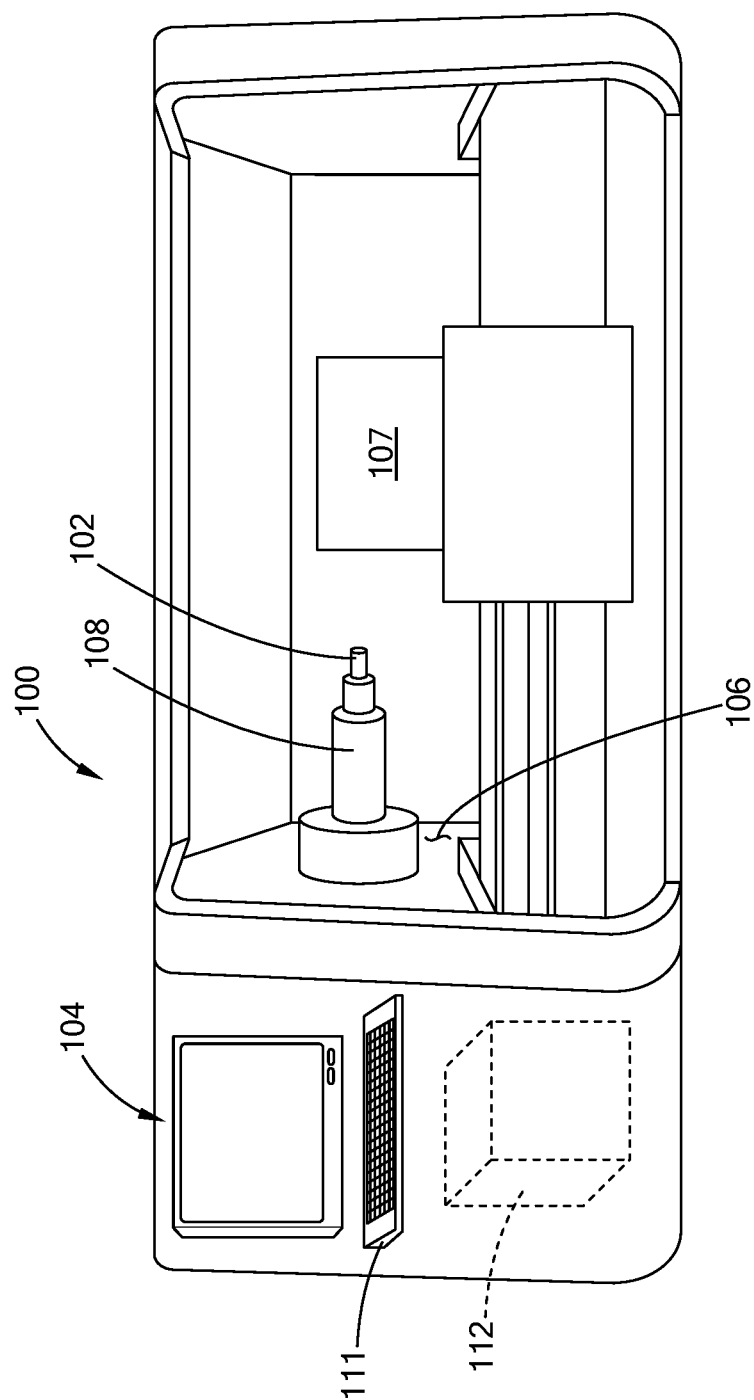
FIG. 1 illustrates a computer numeric control (CNC) machine system equipped with a dynamic characterization (DC) system in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a computer numeric control (CNC) machine system 100 ("CNC system", hereinafter) is equipped with a dynamic characterization (DC) system 102 of the present disclosure. The CNC system 100 includes a CNC system controller 104 and a multi-axis CNC machining center 106 ("CNC machine" hereinafter) that is operable to form a part (e.g., an engine block) out of a workpiece 107 (e.g., metal casting). The CNC machine 106 includes a spindle 108 and a tool (not shown) attached to an end of the spindle 108. The tool is selected from multiple tools housed in a tool magazine 112. The spindle 108 and/or the workpiece are moveable relative to each other along multiple axes, such that the spindle 108 aligns with a section of the workpiece 107 that is to be machined. The teachings of the present disclosure are applicable to other machines, and should not be limited to the CNC system 100 depicted.

The CNC system controller 104 is configured to operate the CNC machine 106 using one or more pre-stored programs. Accordingly, along with other components of the CNC machine 106, the CNC system controller 104 controls the torque, position, orientation, and other operation parameters of the spindle 108 in order to form the part. The CNC system controller 104 may be accessible by an operator via a user interface 111.

The CNC system controller 104 is also configured to perform diagnostics on the CNC system 100 to ensure the system 100 is operating within certain parameters. In one form, using the DC system 102 of the present disclosure, the CNC system controller 104 performs a vibrational analysis of the CNC machine 106 to determine structural dynamics of the machine 106. The DC system 102 measures a dynamic energy of the CNC machine 106 in response to a controlled excitation signal generated by the DC system 102. Based on the data received, the CNC system controller 104 performs diagnostics to determine if the machine is operating within predefined parameters.

Figure 2:
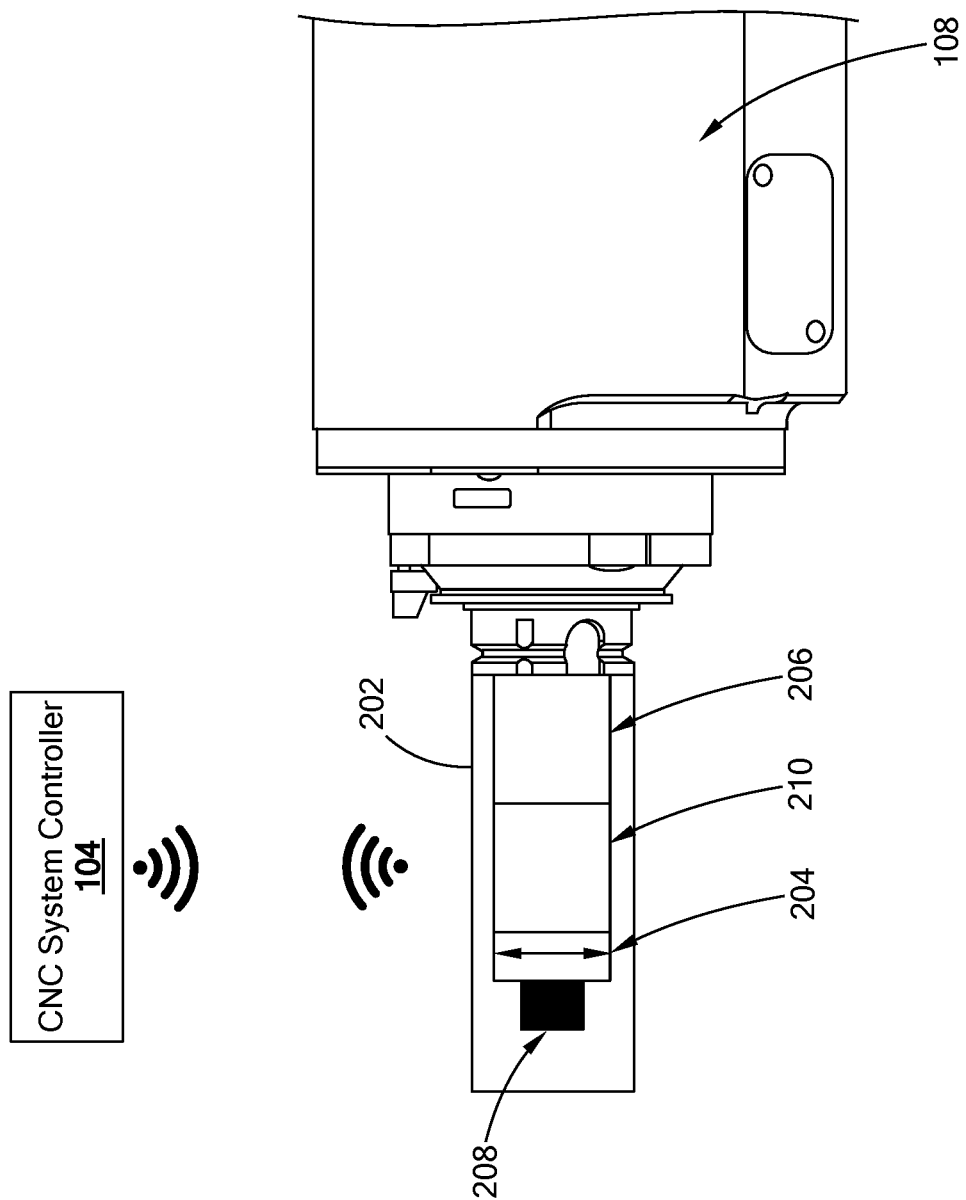
FIG. 2 illustrates one form of a DC system positioned at a spindle of the CNC machine in accordance with the teachings of the present disclosure.

Referring to FIG. 2, in one form, the dynamic characterization system 102 includes a casing 202, a vibration mechanism 204, a power supply 206, an accelerometer 208, and a dynamic characterization (DC) controller 210. As illustrated, the casing 202 houses the vibration mechanism 204, the power supply 206, the accelerometer 208, and the DC controller 210. In one form, the casing 202 is configured to interface with the spindle 108, so that the DC system 102 is readily attachable and detachable from the spindle 108. For example, the DC system 102 may be stored in the tool magazine 112 of the CNC machine 106, and in the event a vibrational analysis of the is to be performed, the CNC system controller 104 operates the CNC machine 106 to retrieve the DC system 102 from the tool magazine 112 and attach the system 102 to the spindle 108. In another form, the DC system 102 is positioned on the CNC machine 106 by an operator and is attachable to different locations along the CNC machine 106. Accordingly, the physical configuration of the casing 202 may be altered based on the environment in which the DC system 102 is utilized.

The vibration mechanism 204 is operable to generate a predefined excitation signal for causing a dynamic response from the spindle 108. In one form, the vibration mechanism 204 is a piezoelectric actuator that is operable by the DC controller 210. In another form, the vibration mechanism 204 is an unbalanced mass that is mounted on the spindle to generate the excitation signal (i.e., input force). In this form, the DC system 102 can deliver more energy to excite heavier components of the CNC machine 106 at frequencies related to the spindle 108 rotational speed.

The power supply 206 provides power to one or more components of the DC system 102. For example, the power supply 206 supplies power to at least one of the DC controller 210, the vibration mechanism 204, and/or the accelerometer 208. In one form, the power supply 206 is a turbine generator that converts mechanical energy from the spindle, such as compressed air, to electrical energy. Other power supplies, such as a battery, are also within the scope of the present disclosure.

The accelerometer 208 measures dynamic energy (i.e., acceleration) along one or more axes in response to the excitation signal. More particularly, the excitation signal generated by the vibration mechanism 204 causes vibrations along the spindle 108, and the accelerometer 208 measures the intensity of the vibration. In one form, the accelerometer 208 transmits data indicative of the dynamic energy of the spindle 108 as a dynamic response signal to the DC controller 210. In other forms, the accelerometer may output the signal to the CNC system controller 104, as described below.

Figure 3:
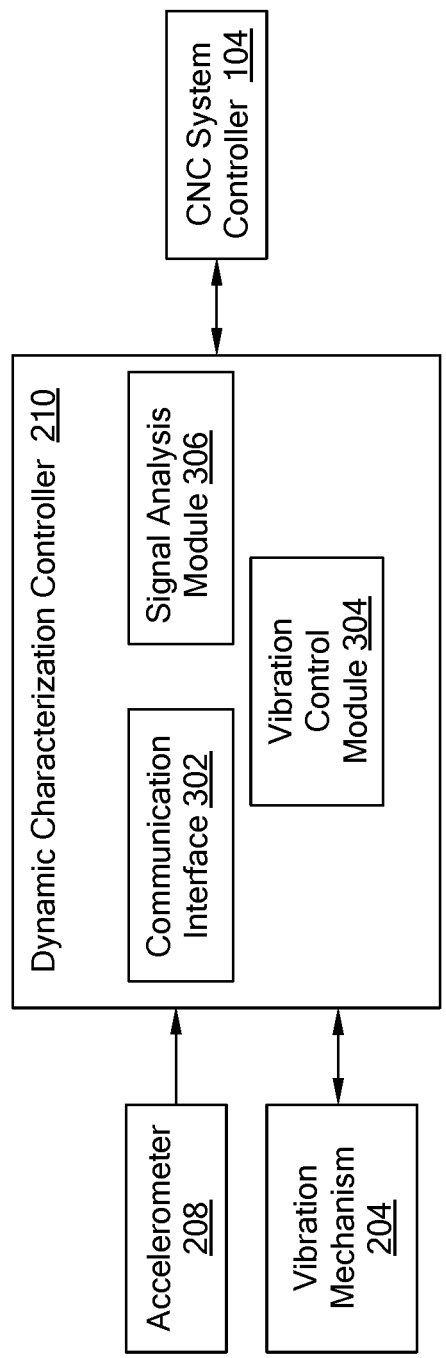
FIG. 3 is a block diagram of a DC controller of the DC system in accordance with the teachings of the present disclosure.

The DC controller 210 is configured to control the operation of the vibration mechanism 204 and communicate with the CNC system controller 104 of the CNC system 100. Referring to FIG. 3, in one form, the DC controller 210 includes a communication interface 302, a vibration control module 304, and a signal analysis module 306. In addition to the various components discussed below, the DC controller 210 includes electronic components, such as a microcontroller, filters (e.g., fast Fourier Transform chip), a transceiver, a capacitor for holding charge, and other suitable electronics for performing the various functions described herein.

The communication interface 302 establishes communication with external systems, such as the CNC system controller 104. In one form, the communication interface 302 includes a Bluetooth transceiver for establishing wireless communication using Bluetooth protocol. The communication interface 302 may utilize other wireless communication protocols, such as Wi-Fi, radio frequency communication, and Zigbee, and should not be limited to Bluetooth protocol.

The vibration control module 304 controls the vibration mechanism 204 to have the vibration mechanism 204 generate the excitation signal, which may also be referred to as a input force. The vibration control module 304 may be configured in various suitable ways for outputting the excitation signal. For example, in one form, the vibration control module 304 stores one or more signal profiles and selects the excitation signal from among the one or more signal profiles based on a command from the CNC system controller 104, which identifies a desired signal profile of the excitation signal. In another form, the vibration control module 304 is programmed to select certain signal profiles once power is received to the DC controller 210, and thus, no further instruction is needed from the CNC system controller 104.

The excitation signal acts as an input force that causes vibration (e.g., dynamic energy) along the CNC machine 106. In one form, the excitation signal includes, but is not limited to, a sine waveform having a set frequency or a chirp signal in which the frequency changes (i.e., increases or decreases) with time. Since the excitation signal is based on a known signal profile, the input force applied to the CNC machine is consistent and not subject to operator error.

In one form, the signal analysis module 306 transmits signals indicative of the excitation signal and the dynamic response signal from the accelerometer 208. For example, the signal analysis module 306 is configured to transform the excitation signal as a frequency domain signal and transmits the corresponding signal as a vibration input signal to the CNC system controller 104 by way of the communication interface 302. As another example, the signal analysis module 306 is configured to transform the dynamic response signal from the accelerometer 208 to a frequency domain signal and further, filters the transformed signal. That is, the transformed signal is transposed from its measured location (i.e., position of the accelerometer) to a desired location (e.g., an end of the spindle). The filtered signal is then transmitted to the CNC system controller 104 as a vibration signal by way of the communication interface 302.

In an example operation, the DC system 102 is stored in the tool magazine 112 of the CNC machine 106, and the CNC system controller 104 operates the CNC machine 106 to have the machine 106 retrieve the DC system 102 when a vibrational analysis of the CNC machine 106 is to be performed. In one form, when the power supply is a turbine generator, the system controller 104 outputs air from the spindle 108 to drive the turbine generator and thus, supply power to the components of the DC system 102. The DC controller 210 operates the vibration mechanism 204 to generate the excitation signal, and the accelerometer 208 measures vibrations of the CNC machine. The DC controller 210 transmits data to the CNC system controller 104 based on the excitation signal and the dynamic response signal from the accelerometer 208.

Using the data from the DC controller 210, the CNC system controller 104 assesses the stability of the machine. In one form, the CNC system controller performs a frequency response function (FRF) measurement to determine stability lobes of the CNC machine 106. Other possible analysis performed by the CNC system controller 104 using the data from the DC system 102 is also within the scope present disclosure. Once the vibrational analysis is completed, the CNC system controller 104 operates the CNC machine 106 to have the DC system 102 placed back in the tool magazine 112. Other operations and/or methods of using the DC system 102 are also within the scope of the present disclosure. For example, an operator may position the DC system at other locations of the CNC machine 106 to measure the dynamic response of the CNC machine 106.

Figure 4:
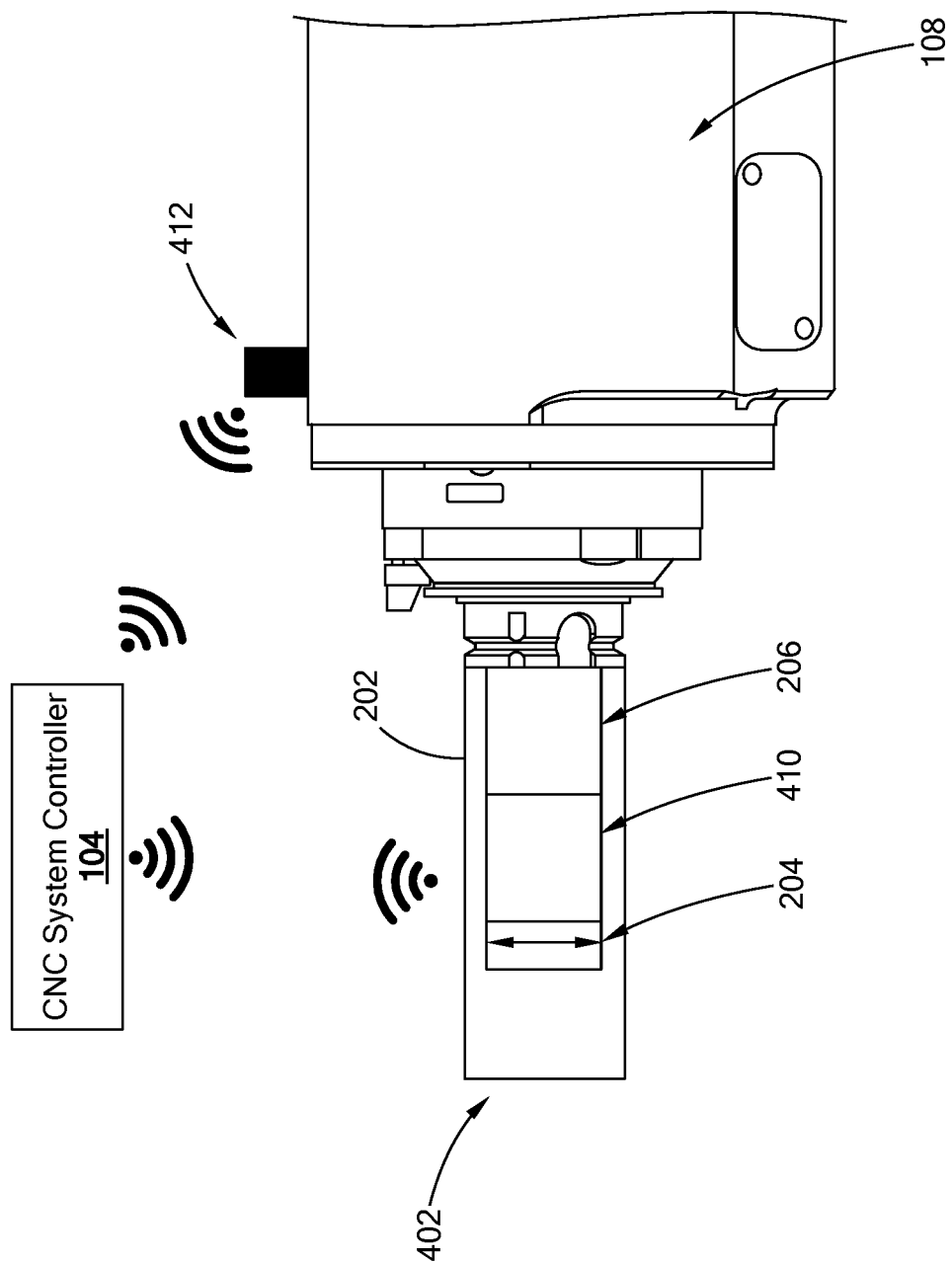
FIG. 4 illustrates another form of a DC system positioned at the spindle in accordance with the teachings of the present disclosure.

The DC system 102 of the present disclosure includes a dedicated accelerometer for measuring the dynamic energy of the CNC machine 106. In an alternative form, a DC system is configured to utilize an accelerometer of the CNC machine 106. Referring to FIG. 4, a DC system 402 includes the casing 202, the vibration mechanism 204, a power supply 206, and a DC controller 410. Similar to the DC controller 210, the DC controller 410 is configured to operate the vibration mechanism 204 and transmit data indicative of the excitation signal to the CNC system controller 104.

The CNC machine 106 includes an accelerometer 412 disposed on the spindle 108 for measuring the dynamic energy of the CNC machine 106. In one form, the accelerometer 412 provides data indicative of the dynamic energy during normal machining operation and/or during diagnostics performed by the CNC system controller 104.

By removing the accelerometer and utilizing an existing an accelerometer on the CNC machine 106, the DC system 402 is further simplified. For example, the DC controller 410 is configured to provide data regarding the excitation signal and is not required to process the signal from the accelerometer 412.

With the DC system of the present disclosure, the CNC system receives machine dynamics based on known force inputs (i.e., predetermined excitation signal) and not on an operator's experience. Furthermore, the CNC system 100 can perform the vibrational analysis without having to be offline. That is, the CNC system 100 can obtain the dynamic response of the CNC machine 106 automatically without the assistance of an operator. The CNC system is able to characterize an entire work envelope, and not just the dynamic response at a few fixed configuration, which may not include structural weak points at all input frequencies. That is, the DC system is able to characterize the entire workspace, including areas inside the machine not safely accessible by a human operator, and thus can investigate structurally weak portions of the machine structure which cannot be measured by manual methods while the machine is in operating mode.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:
1. A system comprising:
a machining tool including a spindle; and
a dynamic characterization system attachable to the machining tool and including:
   a vibration mechanism operable to generate a predefined excitation signal;
   an accelerometer operable to measure dynamic energy of the machining tool in response to the predefined excitation signal and output a dynamic response signal indicative of the dynamic energy;
   a controller including a communication interface, wherein the controller is configured to:
      store a plurality of known signal profiles,
      select a known signal profile from among the plurality of known signal profiles for the predefined excitation signal,
      operate the vibration mechanism to have the vibration mechanism generate the predefined excitation signal having the selected known signal profile, and
      transmit a vibration input signal that is indicative of the predefined excitation signal having the selected known signal profile by way of the communication interface; and
a casing housing the vibration mechanism and the controller, wherein the casing is attachable to and detachable from a proximal end of the spindle.

2. The system of claim 1, wherein the casing further houses the accelerometer.

3. The system of claim 1, wherein the controller transmits a vibration signal based on the dynamic response signal from the accelerometer by way of the communication interface.

4. The system of claim 1, wherein the accelerometer is located separately from the casing.

5. The system of claim 1 further comprising a power source supplying power to at least one of the vibration mechanism or the controller, wherein the casing houses the power source.

6. The system of claim 5, wherein the power source is a turbine generator.

7. The system of claim 1, wherein the vibration mechanism is a piezoelectric actuator.

8. The system of claim 1, wherein the communication interface includes a wireless transceiver.

9. A system comprising:
a dynamic characterization system including:
a piezoelectric actuator operable to generate a predefined excitation signal to cause a dynamic response from an object;
an accelerometer operable to measure dynamic energy of the object in response to the predefined excitation signal and generate a dynamic response signal indicative of the dynamic energy;
a controller including a wireless transceiver, wherein the controller is configured to:
store a plurality of known signal profiles,
operate the piezoelectric actuator to have the piezoelectric actuator generate the predefined excitation signal having the selected known signal profile, and
output data indicative of the predefined excitation signal having the selected known signal profile by way of the wireless transceiver; and
a casing configured to attach and detach from a proximal end of the object, wherein the casing houses the piezoelectric actuator and the controller, and wherein the casing is attachable to and detachable from the proximal end of the object.

10. The system of claim 9 further comprising a power source supplying power to the piezoelectric actuator and the controller.

11. The system of claim 10, wherein the power source is a turbine generator.

12. The system of claim 9, wherein the casing houses the accelerometer, and the accelerometer outputs the dynamic response signal to the controller.

13. The system of claim 12, wherein the controller is configured to filter the dynamic response signal from the accelerometer and output data indicative of the filtered dynamic response signal using the wireless transceiver.

14. The system of claim 12, wherein the controller transposes the dynamic response signal from a measured location to a desired location.

15. The system of claim 9, wherein the accelerometer is positioned on the object at a location separate from the casing.

16. A system comprising:
a machining tool including a spindle; and
a dynamic response measurement system attachable to the machining tool and including:
a piezoelectric actuator operable to generate a predefined excitation signal;
an accelerometer operable to measure dynamic energy of the machining tool in response to the predefined excitation signal generated by the piezoelectric actuator and to output a response signal indicative of the dynamic energy of the machining tool;
a controller configured to:
store a plurality of known signal profiles,
select a known signal profile from among the plurality of known signal profiles as the predefined excitation signal,
operate the piezoelectric actuator to have the piezoelectric actuator generate the predefined excitation signal having the selected known signal profile, and
output data indicative of the predefined excitation signal having the selected known signal profile; and
a casing housing the piezoelectric actuator and the controller, and wherein the casing is attachable to and detachable from a proximal end of the spindle.

17. The system of claim 16, wherein the casing houses the accelerometer.

18. The system of claim 16, wherein the accelerometer is positioned on the machining tool separate from the casing.

19. The system of claim 16 further comprising a turbine generator for supplying power to at least one of the controller or the piezoelectric actuator.

20. The system of claim 9 further comprising a machining tool, as the object, wherein the machining tool includes a spindle, and the casing is attachable to and detachable from the proximal end of the spindle.

* * * * *